(12) United States Patent
Tuladhar et al.

(10) Patent No.: US 10,211,754 B2
(45) Date of Patent: Feb. 19, 2019

(54) ISOLATED SWITCHED SOURCE UNIVERSAL INVERTER TOPOLOGY

(71) Applicant: RHOMBUS ENERGY SOLUTIONS, INC., San Diego, CA (US)

(72) Inventors: Anil Tuladhar, Canton, MI (US); Frederick Flett, Indio, CA (US)

(73) Assignee: Rhombus Energy Solutions, Inc., San Diego, CA (US)

( * ) Notice: Subject to any disclaimer, the term of this patent is extended or adjusted under 35 U.S.C. 154(b) by 183 days.

(21) Appl. No.: 15/296,969

(22) Filed: Oct. 18, 2016

(65) Prior Publication Data

US 2017/0110982 A1 Apr. 20, 2017

Related U.S. Application Data

(60) Provisional application No. 62/243,068, filed on Oct. 18, 2015, provisional application No. 62/292,434, filed on Feb. 8, 2016.

(51) Int. Cl.
*H02M 7/493* (2007.01)
*H02M 7/497* (2007.01)
*H02M 7/5387* (2007.01)
*H02M 7/48* (2007.01)

(52) U.S. Cl.
CPC ............. *H02M 7/48* (2013.01); *H02M 7/493* (2013.01); *H02M 7/497* (2013.01); *H02M 7/53871* (2013.01); *H02M 7/53873* (2013.01); *H02M 7/53875* (2013.01)

(58) Field of Classification Search
CPC ........ H02M 7/48; H02M 7/493; H02M 7/497; H02M 7/501; H02M 7/537; H02M 7/5387; H02M 7/53871; H02M 7/53873; H02M 7/53875; H02M 2007/4822; H02M 2007/53876
See application file for complete search history.

(56) References Cited

U.S. PATENT DOCUMENTS

| 4,327,314 A * | 4/1982 | Hosokawa | H02P 25/024 318/713 |
|---|---|---|---|
| 2007/0194627 A1* | 8/2007 | Mori | H02M 7/49 307/103 |
| 2015/0204730 A1* | 7/2015 | Daitoku | G01K 7/01 374/178 |
| 2017/0310240 A1* | 10/2017 | Li | H02M 7/537 |

\* cited by examiner

*Primary Examiner* — Levi Gannon
(74) *Attorney, Agent, or Firm* — Jonathan A. Kidney; CKR Law

(57) ABSTRACT

A device and method for generating single/split or three phase AC voltages from a DC source with 1 to 2 times gain in output voltage without using any DC/DC boost or an output transformer. An isolation/multiplexer/mixer circuit successively charges multiple power modules, allowing each power module to generate output voltage(s) with desired magnitudes and phases, and allows independent outputs of each power converter modules to be reconnected to obtain up to two times the conventional possible output voltage. An isolation block eliminates the common mode noise problem. The gain in output voltage and isolation between the output converters eliminates the need of the front end DC/DC converter or an output transformer for most of the DC voltage sources, which improves cost, power density, efficiency and reliability of the inverter.

20 Claims, 12 Drawing Sheets

ISOLATED SWITCHED SOURCE UNIVERSAL INVERTER TOPOLOGY

CROSS-REFERENCE TO RELATED APPLICATION(S)

This application claims the benefit of U.S. Provisional Patent Application No. 62/243,068 filed Oct. 18, 2015 titled "Switched Source Universal Bi-Directional Inverter Topology", and U.S. Provisional Patent Application No. 62/292,434, filed Feb. 8, 2016, titled "Isolated Switched Source Universal Inverter Topology", the contents of which are hereby incorporated by reference in their entirety.

FIELD

The present invention relates generally to the field of electric power converter systems. More particularly, this invention relates to an isolated, bi-directional capable power inverter topology for outputting single or split or three phase power for grid connectivity or supporting local loads in off grid mode, using input DC sources.

BACKGROUND

An ideal power inverter should have low losses, higher power density, lower cost, ability to support unbalanced load, ability to support split/single phase load and higher reliability. In reality, existing topologies suffer from deficiencies in one or more of the above "ideal" features. The new proposed Topology described hereafter addresses one or more of the deficiencies in the prior art.

SUMMARY

In addition to the description elucidated below, in various embodiments, aspects of a transformer-less method of generating a single phase, split-phase or three phase AC output voltages is provided, comprising: coupling an input of a source switching multiplexer to an output of at least one of a grid source and DC source, and selectively transferring multiplexed power to an input of at least one power converter; successively power converting the multiplexed power to generate a predetermined AC energy level, wherein a first power converter of the at least one power converter generates a predetermined voltage and phase angle that is independent of a second power converter of the at least one power converter; and adding outputs from the power converters to generate a peak output AC voltage or AC current that is capable of being higher than the input source, without switching to higher input voltages or using a transformer.

In other embodiments, another aspect of the above method is provided, further comprising a plurality of power converters, which are combinable via software controllable switches, having independent voltage outputs to enable them to be independently combined; and/or wherein the software controllable switches are controlled to produce an output voltage that is at least one of a single phase, split phase and three phase; and/or wherein the generated output AC voltage or AC current is twice the source voltage or current; and/or wherein a switchable full bridge is employed that can be switched to a unipolar switching pattern to reduce a filter size; and/or wherein a power converter switching frequency carrier wave is phase shifted, to obtain additional reduction in the filter size; and/or wherein each power converter is independently controlled to obtain variable output phases and magnitudes; and/or further comprising, isolating the source from a load using a front end isolator circuit; and/or further comprising, feeding power back into the source via a bi-directional isolator circuit; and/or further comprising, recovering power using a snubber circuit.

In another aspect, a transformer-less, switched source universal power inverter is provided, comprising: a source switching multiplexer coupled to an output of at least one of a grid source and DC source, configured to output selectively multiplexed power; at least one switchable power converter, coupled to an output of the multiplexer, configured to successively power convert the multiplexed power to generate a predetermined AC energy level, wherein a first power converter is configured to generate a predetermined voltage and phase angle that is independent of a second power converter; and computer or processor controllable switches, configured to combine outputs from the power converters to generate a peak output AC voltage or AC current that is capable of being higher than the input source, without switching to higher input voltages or using a transformer.

In yet another aspect, the device above is provided, further comprising a plurality of power converters, which are combinable via software controllable switches, having independent voltage outputs to enable them to be independently combined; and/or wherein the output of inverter produces at least one of a single phase, split phase and three phase power; and/or wherein the output is twice the source voltage or current magnitude; and/or further comprising a switchable full bridge in the power converter(s), adapted to be switched to a unipolar switching pattern to reduce a filter size; and/or further comprising a processor with software controlling switching of each power converter in an independent manner, to obtain variable output phases and magnitudes; and/or further comprising, a front end isolator circuit; and/or wherein at least one of the isolator and full bridge is bi-directional, permitting power to be fed back to the source; and/or further comprising, a snubber circuit in the isolater, permitting recovery of power; and/or wherein the full bridge is adapted to be switched into a full wave active rectifier, allowing transport of regenerative power from suitable loads to be applied with a controlled power range to the source.

DETAILED DESCRIPTION

Figure 1:
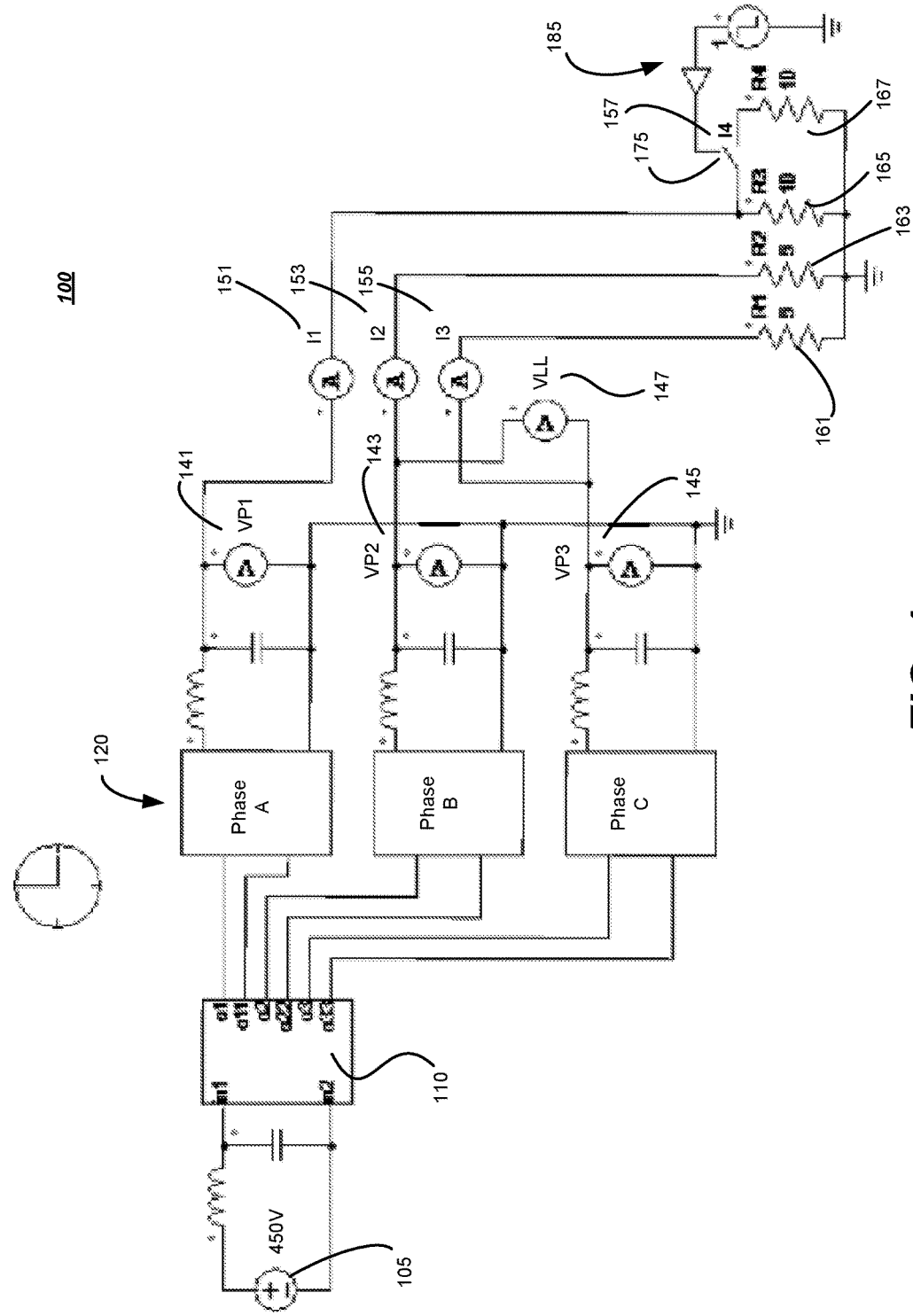
FIG. 1 is a high level block diagram (simulation model) of an exemplary switched source inverter topology.

Ideally, a power inverter should have input-to-output isolation, low losses, higher power density, lower cost, ability to support unbalanced load, ability to support split/single phase load, and high reliability. Existing topologies suffer from one or the other drawbacks, examples being listed below:

1. Two level inverter with an output transformer—This configuration suffers from low power density, and low efficiency.

2. Transformer-less, two level inverter with a split DC capacitor—This configuration suffers from multiple problems. For example, a lack of equal voltage sharing between the split capacitors causes voltage ripple. Or, a large unbalanced or nonlinear load(s) causes a perturbation in the split voltages. In order to go transformerless, the input DC bus voltage has to be sufficiently high. This leads to higher switching losses on the inverter, and if the DC input source is lower than the required voltage, a front end DC/DC converter is required. This erodes the efficiency further. The lack of isolation can cause common mode noise issues. It is apparent that the above approaches introduce additional problems, in their attempt to provide better performance. The following are some other examples of problems:

1. Transformer-less, two level inverter with a fourth leg—The control algorithm for a four-leg inverter is complicated. This can lead to more reliability issues. In order to go transformerless, the input DC bus voltage has to be sufficiently high and this system has similar problems as the above two level inverter with split DC capacitor.

2. Transformer-less, three level inverter with a DC/DC front end—Multi-level inverter reduces the switching losses on the inverter power stage. However, the losses in the front end decrease the overall efficiency. Complexity in handling unbalanced loads further decreases its appeal. The lack of isolation can cause common mode noise issues.

In view of the drawbacks of the prior-art approaches, a new approach is presented in several of the embodiments below, which describes a bi-directional capable, power inverter topology for generating power from or to DC sources, such as various kinds of batteries including Li-ion, lead acid, lead carbon, flow batteries, solar cells, fuel cells etc. to generate single or split or three phase power for grid connectivity or to support local loads in off grid mode. The wide input operation range via this topology is especially beneficial to harvest more power, for example, from solar arrays. Wider range means early power generation and staying grid-connected even until late evening (when the input voltage is lower due to lower solar energy). Wider input range also allows more flexibility in battery selection for energy storage power converters. Other advantages and uses will be apparent to one of ordinary skill in the art.

Several of the disclosed embodiments herein provide a universal AC output (single phase, split phase or three phase, etc.) from or to a DC source to support single phase, split phase or three phase grid or load. In some embodiments, it is capable of providing 1 to 2 times more line-to-line voltage compared to the conventional single phase inverter with the same DC input voltage through vector addition. Additionally, a unique multiplexer/mixer which successively connects the input DC source to multiple converters to achieve flexible power conversion is described.

Also, the various exemplary system(s) provide a lower voltage exposure to switching devices to reduce the switching losses, as well as a lower switching frequency for the multiplexer/mixer module to achieve higher efficiency of the system. Proper coordination of reactive components can allow as low as 2 kHz switching frequency, which will reduce switching losses, improve isolation and reduce noise effects. In various embodiments, a seamless bidirectional capability to get DC from AC is described.

The methods/systems also introduce a phase shift among the multiple power converters to achieve higher line-to-line voltage than the DC input voltage through vector manipulation. Also, the switching frequency can be optimized (e.g., reduced) by using a unipolar switching approach on two arms and/or phase shifting the carrier waveform phases among converters to reduce the filter size and cost. The switching frequency used for the multiplexer can be adjusted based on the optimum cost of the filters used and also based on the energy storage capacitor used on the front end of each converter. Furthermore, the voltage drop across the switch can be made very small (both when on or off) so the switching losses are minimal.

FIG. 1 is a block diagram 100 that shows a high level configuration (simulation model with voltage and current test sources (V) & (A)) of an exemplary embodiment. Key sections are the multiplexer 110 and multiple power converter blocks 120 (as a non-limiting example, three single phase H bridges can be used). The DC source 105 on the left hand side of FIG. 1, having an arbitrary voltage of 450V is connected successively, via the multiplexer 110, to each of the three power converter blocks 120 to regularly transfer energy to them. The multiplexer 110 can be comprised of six bi-directional switches (not shown) with three filter inductors (not shown) to transfer the energy to and from the DC bus capacitors (not shown) of the three separate power converter blocks 120. Each H-bridge in the power converter block 120 can comprise a bidirectional mode made of, for example, multiple controllable semiconductor switches (not shown) to obtain desired output voltage waveforms. Control of the multiplexer 110 and the switches described herein are understood to be synchronized to provide the required power from the DC source 105 to the appropriate power control block 120, providing 3-phase or single phase or any other phasing desired. Switching can be via software control, via a computer or processor (not shown). Reconnection of the output voltages of these power converter blocks 120 yields the desired output voltages, whether in phase or out of phase, depending on implementation preference. As shown, assorted series inductors and parallel capacitors may be implemented at the output of the power converter blocks 120, according to deign preference.

It should be noted that since FIG. 1 is a block-level simplification and represents a simulation configuration, additional circuits elements may be added to or removed from FIG. 1, so as to better represent a simulation or an actual implementation. For example, additional capacitances, inductances, resistances may be added to the various legs of the design to replicate actual line or load values, or other representations of an equivalent circuit. These and other modifications and changes are within the purview of one of ordinary skill in the art and therefore understood to be within the scope of this disclosure.

For example, in FIG. 1, VP1 (141), VP2 (143), and VP3 (145) represent three phase to neutral voltage outputs, as signified by the fictitious test voltage sensors (V) at the outputs of the respective power converter blocks 120. VLL (147), with attendant fictitious test voltage sensor (V) represents the line-to-line voltage between phase B and C. Fictitious current sensor (A) with line currents I1 (151), I2 (153), I3 (155), I4 (157) are also illustrated. Resistors R1 (161), R2 (163) and R3 (165) are three arbitrary loads applied to the inverter system at the startup until 0.15 second. It is noted that, for simulation purposes, the load values were 5 Ohms, 5 Ohms, and 10 Ohms, for Resistors R1 (161), R2 (163) and R3 (165), respectively to emulate a real world unbalanced loading condition. At 0.15 second, load R4 (167)—having the same resistive value as R3 (165) is connected via a switch 175 in parallel to R3 (165) to balance the load (note current I4 (157) traveling in the leg). Of course, other time periods or load values may be utilized without departing from the spirit and scope herein. The step source load 185 with switch 175 terminates the circuit. The latter performs a step change in the load by 50% (effectively paralleling a 10 Ohm resistor to the existing 10 Ohm resistor) on one phase. This enables the ability to create a balanced load when the switch 175 is closed, and an imbalanced load (on Phase C) when the switch 175 is open.

Figure 2:
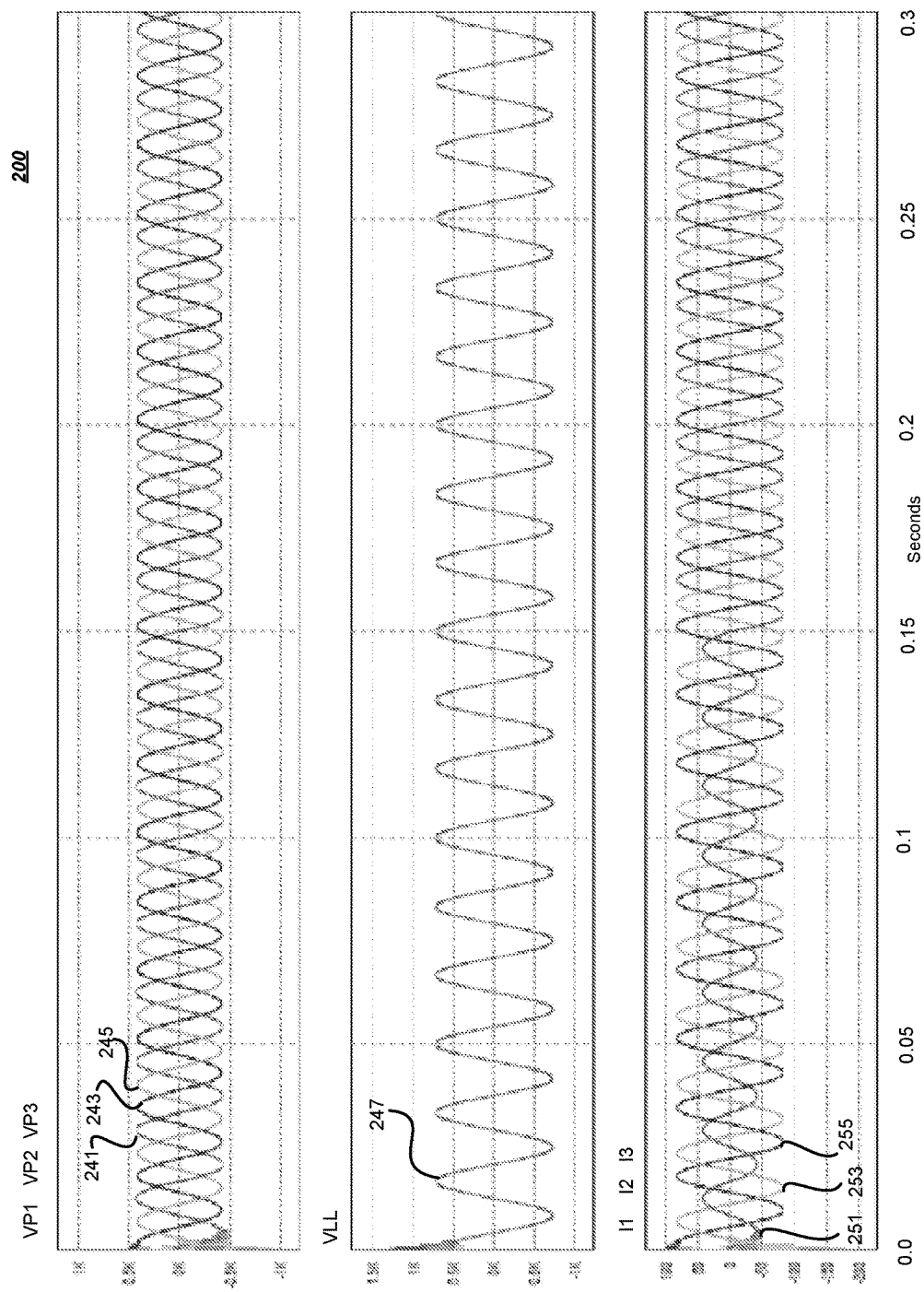
FIG. 2 is a simulation result with 450 V DC input to generate 480V line to line AC output voltages with both balanced and unbalanced loading.

FIG. 2 contains several plots showing simulation results with 450 V DC input generating 480V line to line three phase AC voltages, utilizing the inverter system shown in FIG. 1. The amplitude of VP1 (241), VP2 (243), and VP3 (245) are seen in the top-most figure, as a function of time (seconds). The amplitude of VLL (247) is seen in the middle figure, as a function of time (seconds). The amplitude of the respective line currents I1 (251), I2 (253), and I3 (255) are seen in the bottom most figure, as a function of time (seconds). Loading on the system is deliberately made unbalanced until an arbitrary 0.15 seconds to illustrate the capability of the proposed topology to handle highly unbalanced loading conditions without compromising the output voltage quality. This topology offers 100% unbalanced load handling capability without needing any complex software controllers or hardware circuitries.

Figure 3:
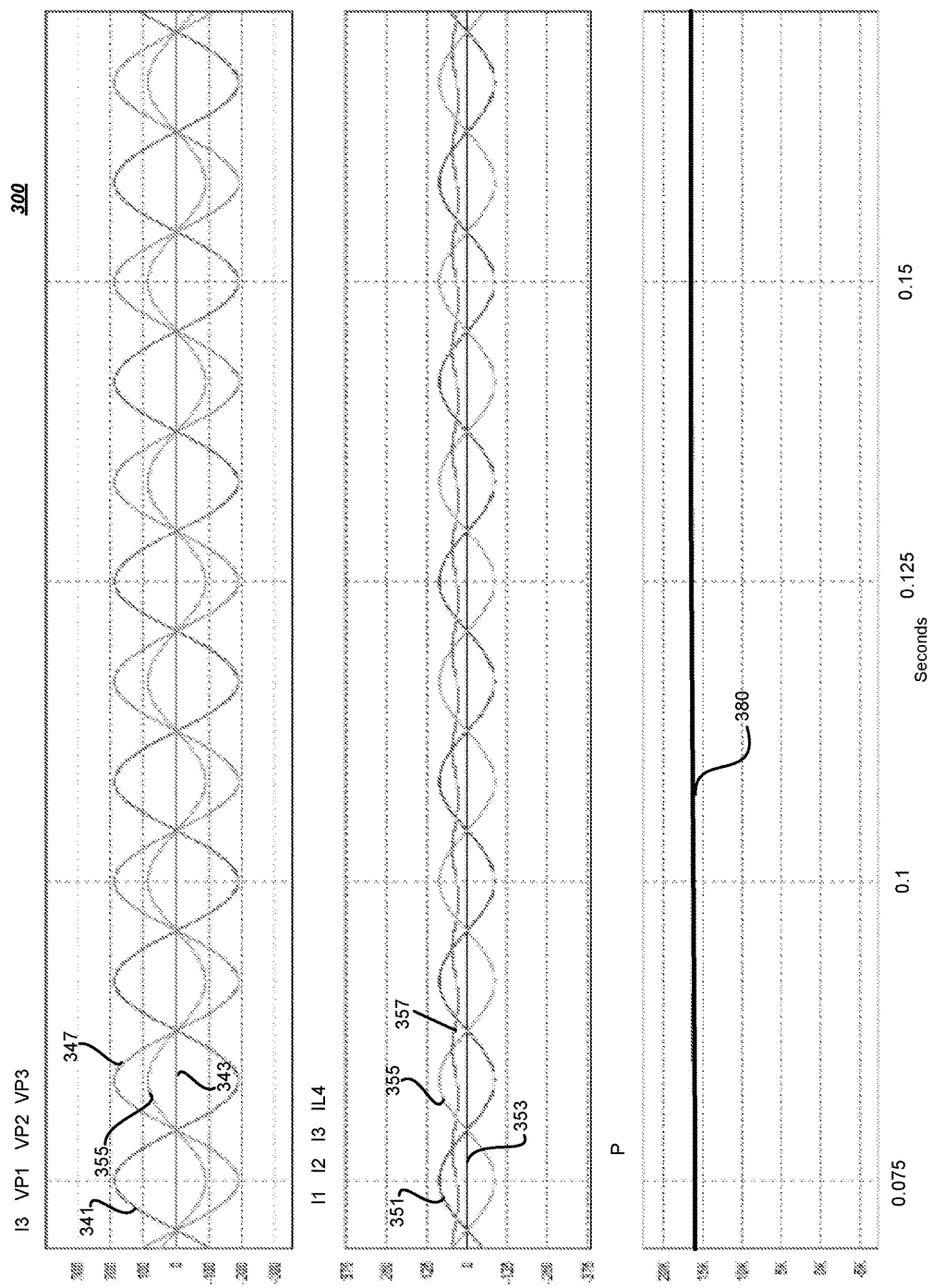
FIG. 3 contains additional plots showing simulation results with 450 V DC input generating 20V line to line, split phase AC voltages, utilizing the switched source inverter system shown in FIG. 1.

FIG. 3 contains additional plots showing simulation results with 450 V DC input generating 480V line to line, split phase AC voltages, utilizing the inverter system shown in FIG. 1. The upper plot shows the amplitude of VP1 (341), VP2 (343), VP3 (347) and I3 (355), as a function of time (seconds). As can be seen, the VP2 (343) is primarily zero though the startup, while the voltages, while VP1 (341) and VP3 (347) are 180 degrees phase shifted from each other. This way, a split-phase voltage can be generated simply by adjusting the phase angle and magnitude command. The middle figure shows a comparison of the phase currents I1 (351), I2 (353), and I3 (355) at the output of the exemplary topology and the DC current IL4 (357) (which is the DC current through input inductor), as a function of time (seconds). The bottom figure shows the power P (380) produced at the load, as a function of time (seconds). These plots illustrate the non-effect of an imbalance on the neutral voltage and current.

Figure 4:
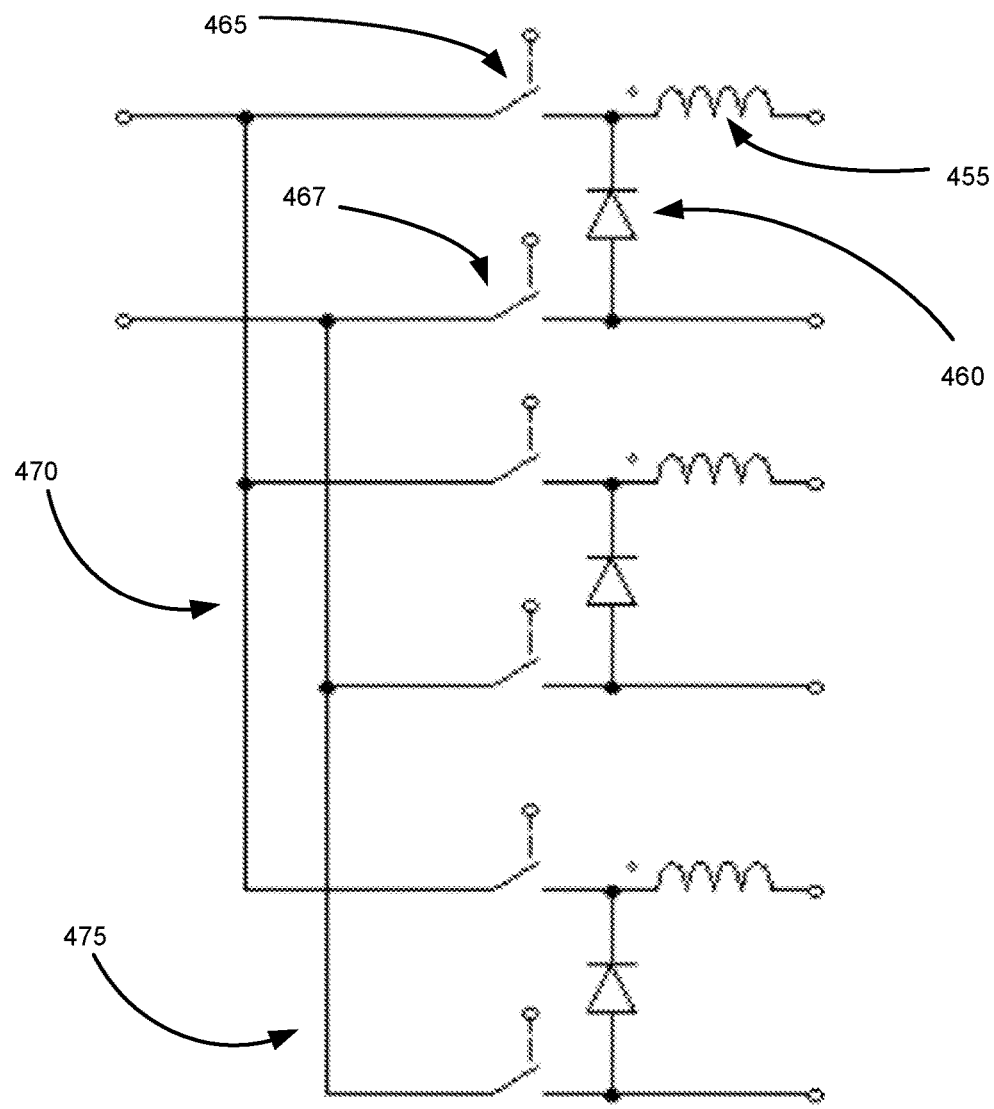
FIG. 4 is a schematic of one possible multiplexer arrangement for the exemplary switched source inverter topology.

FIG. 4 is a schematic 400 of one possible multiplexer arrangement for the exemplary inverter topology. A group of series connected inductors 455 are individually shunted by free-wheeling diodes 460, operating to filter only a given polarity through the inductors 455. Each arrangement is switchably controlled with the "top" connections 470 nested together and the "bottom" connections 475 nested together. They can also be independently controlled, if so desired and each inductor/diode element is controlled by a controllable switch 465. It is noted that the bottom leg 467 of each controllable switch is also switchable. This simple arrangement allows various legs to be turned on or turned off, while allowing polarity preference, for effective multiplexer operation. Of course, the switching commands may be provided by an algorithm or software running on a processor or computer (not shown). It should be apparent, that while FIG. 4 illustrates one particular arrangement of circuit elements for mixing control, it is expressly understood that other combinations of circuit elements (or via a logic circuit) may provide the same functionality. Therefore, modifications and changes to various elements and arrangements as well as type of circuits/devices used can be made without departing from the spirit and scope of this disclosure.

Figure 5:
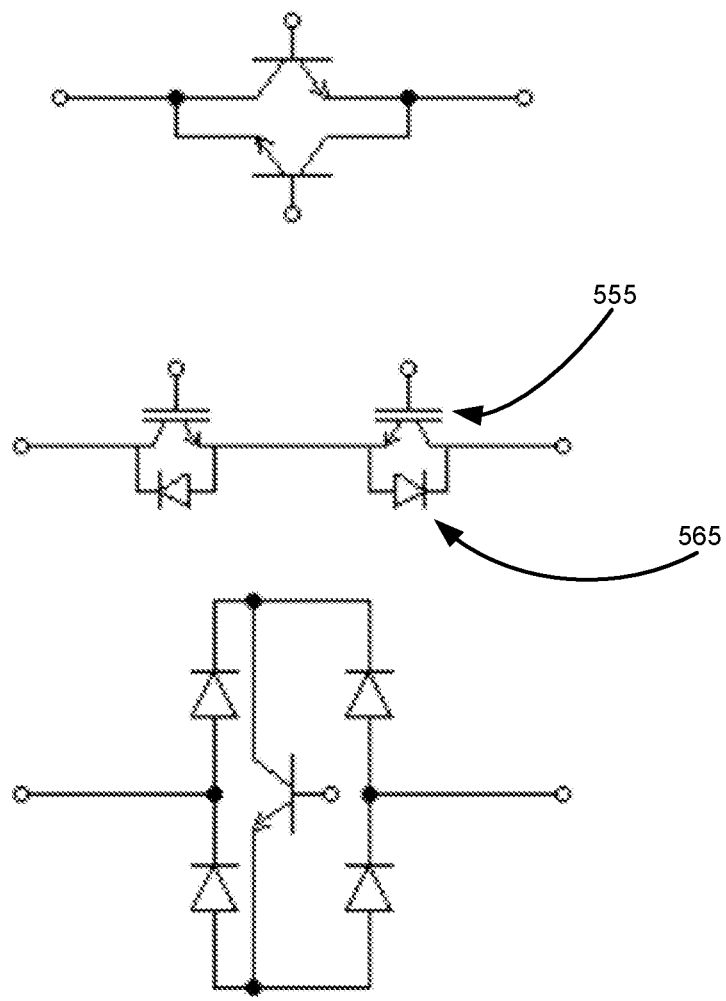
FIG. 5 shows three possible schematics for alternative bidirectional switches.

FIG. 5 shows three possible schematics 500 for alternative bidirectional switches, composed of transistor 555 and/or diode 565 combinations to provide bi-directional switching capabilites, and is self-explanatory. It is understood that the bidirectional switches shown in the above Figs. can be realized in various ways, for example, using a single Insulated-gate bipolar transistor (IGBT) with a diode bridge or using two IGBTS in series with body diodes or two IGBTs without body diodes in parallel, and so forth. FIG. 5 is simply provided to illustrate any one or more possible bi-directional switch designs, understanding that other designs, non-transistor type switches, and so forth are within the purview of one of ordinary skill in the art. Therefore, it is expressly understood that other types of switches may be used, according to design preference.

Figure 6:
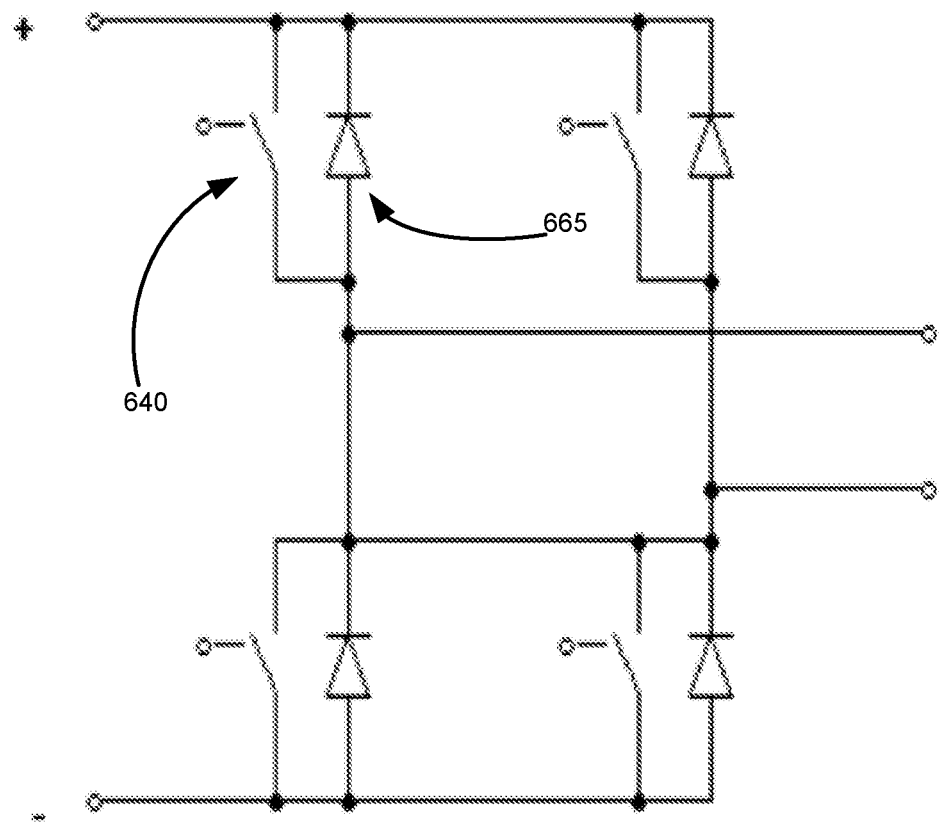
FIG. 6 is an illustration of one possible single phase power inverter configuration for use with an exemplary switched source inverter topology.

FIG. 6 is an illustration 600 of one possible single phase power converter configuration, using a controllable semiconductor switch 640 to "bypass" a blocking diode 665 (or conversely to "turn on" diode 665 when the polarity is reversed). A set of four of these switch/diode combinations can be arranged to provide a power converter matrix. Of course, other circuits and configurations may be utilized according to design preference, It is understood that FIG. 6's circuit is not an unusual circuit, and therefore variations or changes may be utilized. In the topology embodiments shown herein, the matrix converter packages can also be used based upon the number of converters.

The following embodiments describe systems and methods for generating single/split or three phase AC voltages from a DC source with 1 to 2 times (or more) gain in output voltage without using any DC/DC boost or an output transformer. A novel isolation/multiplexer/mixer circuit is proposed that is capable of successively charging multiple power modules, allowing each power module to generate desired output voltages with desired magnitudes and phases, and allow these independent outputs of each power converter module to be reconnected to obtain up to two times the conventional possible output voltage. Importantly, the isolation block isolates the source from the load. This eliminates the common mode noise path without needing galvanic isolation within the dielectric capability of the switching devices. This gain in output voltage and isolation between the output converters eliminates the need of a front end DC/DC converter or an output transformer for most of the DC voltage sources. This improves cost, power density, efficiency and reliability of the inverter.

Figure 7:
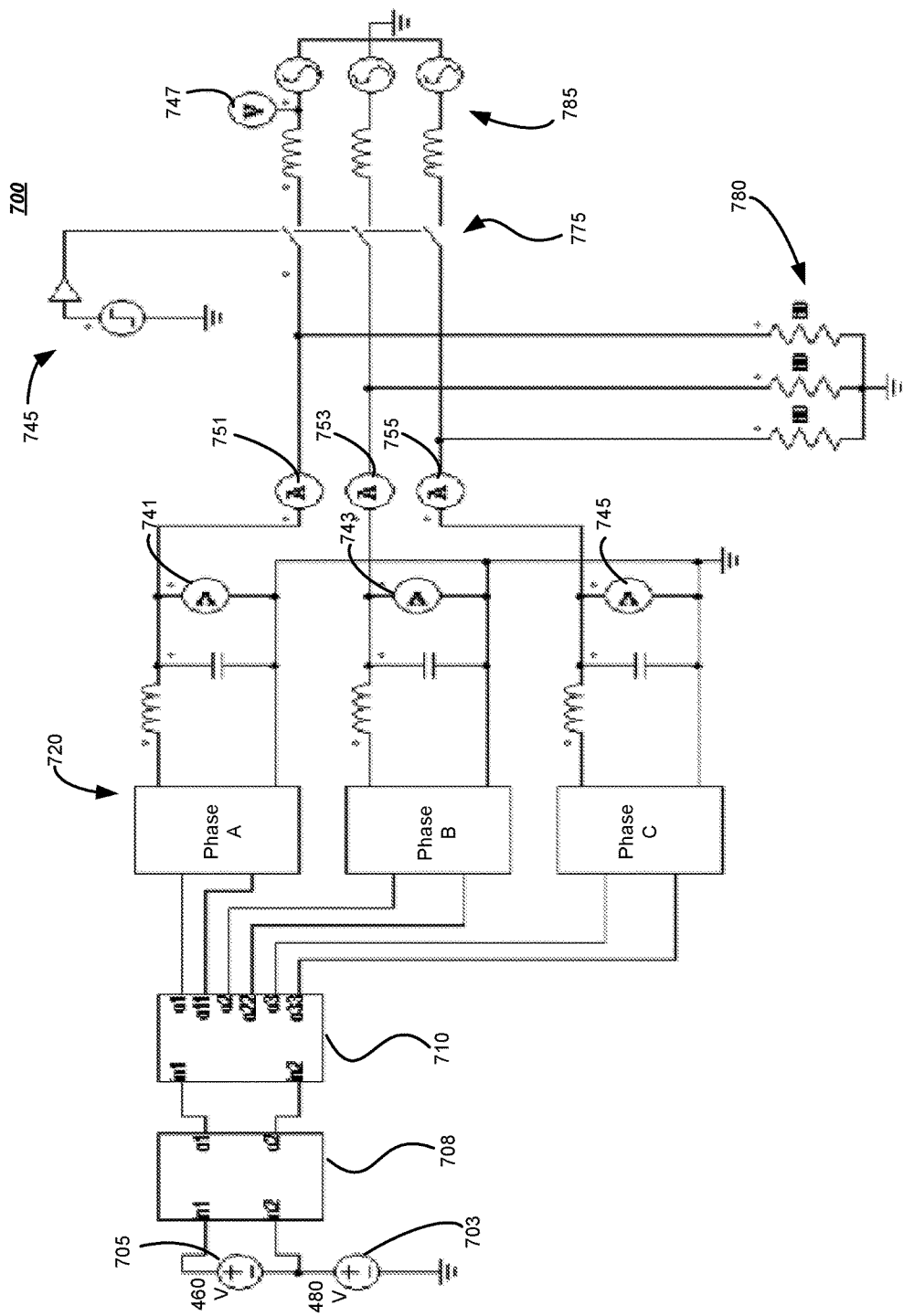
FIG. 7 is a block diagram of a variation of the previous design(s) using an added front end isolator.

FIG. 7 is a block diagram 700 of a variation of the previous design(s) using an added front end isolator. This variation is a topology of a flexible inverter, which can generate three phase, split-phase. and single phase output which can be connected to the grid or to the load. The block diagram 700 shows a three phase converter in 480V Grid Mode 703 with a series connected 460V DC Source 705. In order to show the isolation characteristics, the DC Source 705 negative as well as the grid side neutral (not shown) are grounded. A common mode voltage was also injected into the DC side to illustrate the isolation capability. Of course, the Grid and DC Source voltage values may differ from what is shown.

Isolation block(s) 708 can be formed from the sample circuits shown in FIGS. 4-6, with some variations. These blocks transfer energy to the converters successively while maintaining the isolation among these converters so that the outputs of these converters can be connected in any fashions yielding higher output voltages or currents. The isolation block 708 transfers energy from the source(s) 703, 705 to the buffer very efficiently. The complimentary operation of the switches in isolation block 708, with sufficient blanking time in between, ensures complete isolation of the source(s) 703, 705 to multiplexer 710 following the isolation block 708. The ensuing power inverter blocks 720 (formed with H bridges, for a non-limiting example) channel the phase energy to the respective legs, with "fictitious test voltages" (noting this illustration represents a simulation configuration) V (741, 743, 745) and "fictitious test currents" A (751, 753, 755). Loads 780 are connected to the outputs of the power inverter blocks 720. Switches 775 are also provided to connect or disconnect to the grid, as desired. The grid voltage is sensed using a voltage sensor 747. The grid is simulated with a three phase AC power source 785.

Figure 8:
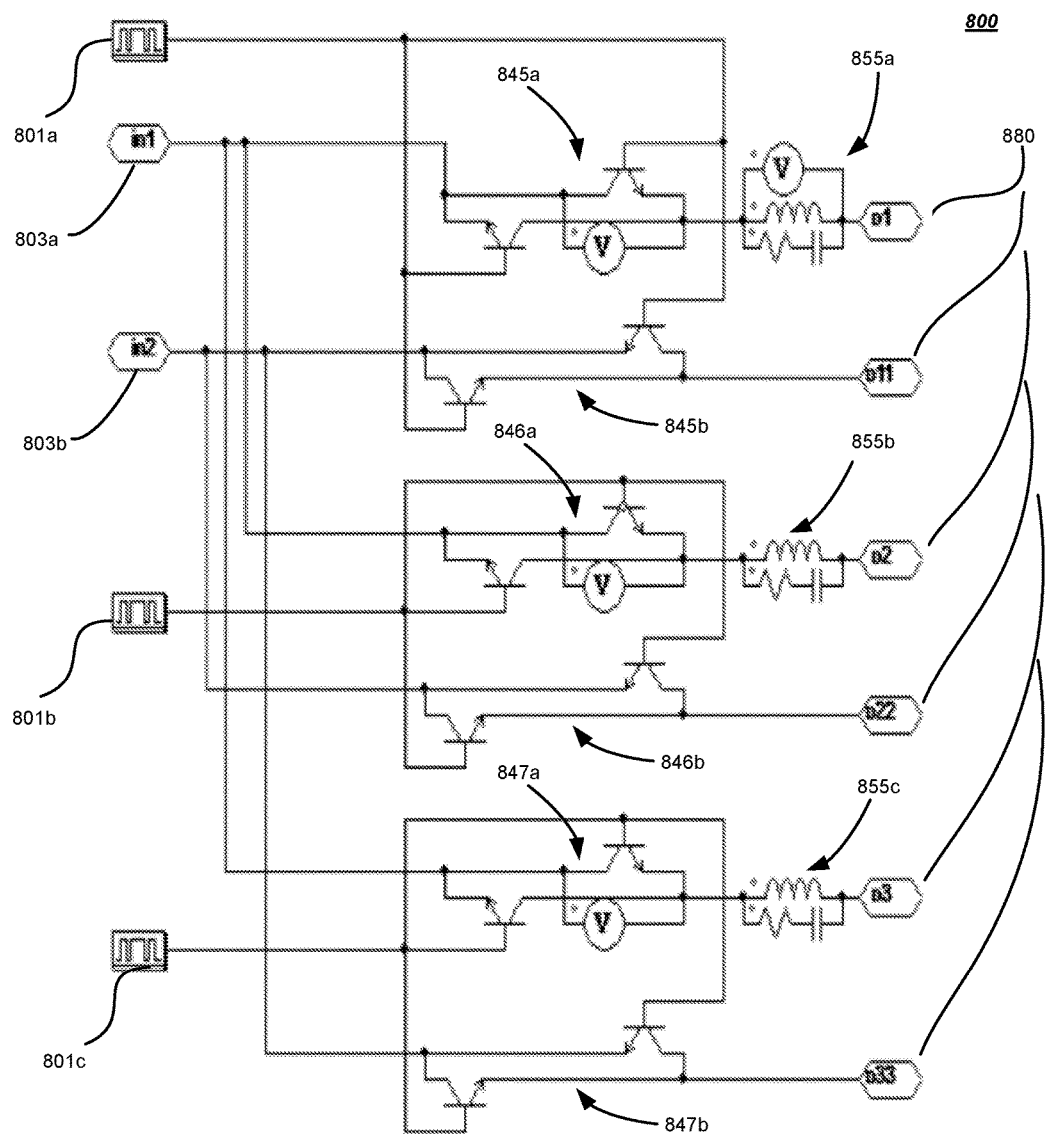
FIG. 8 is a schematic of a variation of an exemplary bi-directional circuit, for use with an exemplary switched source inverter topology

FIG. 8 is a schematic 800 of a variation of an exemplary bi-directional multiplexer circuit capable of transferring power from a buffer (not shown) to the three power converters (shown in previous Figs.) successively. Switching signals 801*a,b,c* provide on/off switching of the downstream transistors (of switch pairs 845*a,b*; 846*a,b*; and 847*a,b*), while input voltages 803*a,b,c* are routed through the switches and output into the inductor/capacitor/resistor equivalences 855*a,b,c*. Rightmost outputs of the circuit 880 are coupled directly or indirectly to the power converters.

Figure 9:
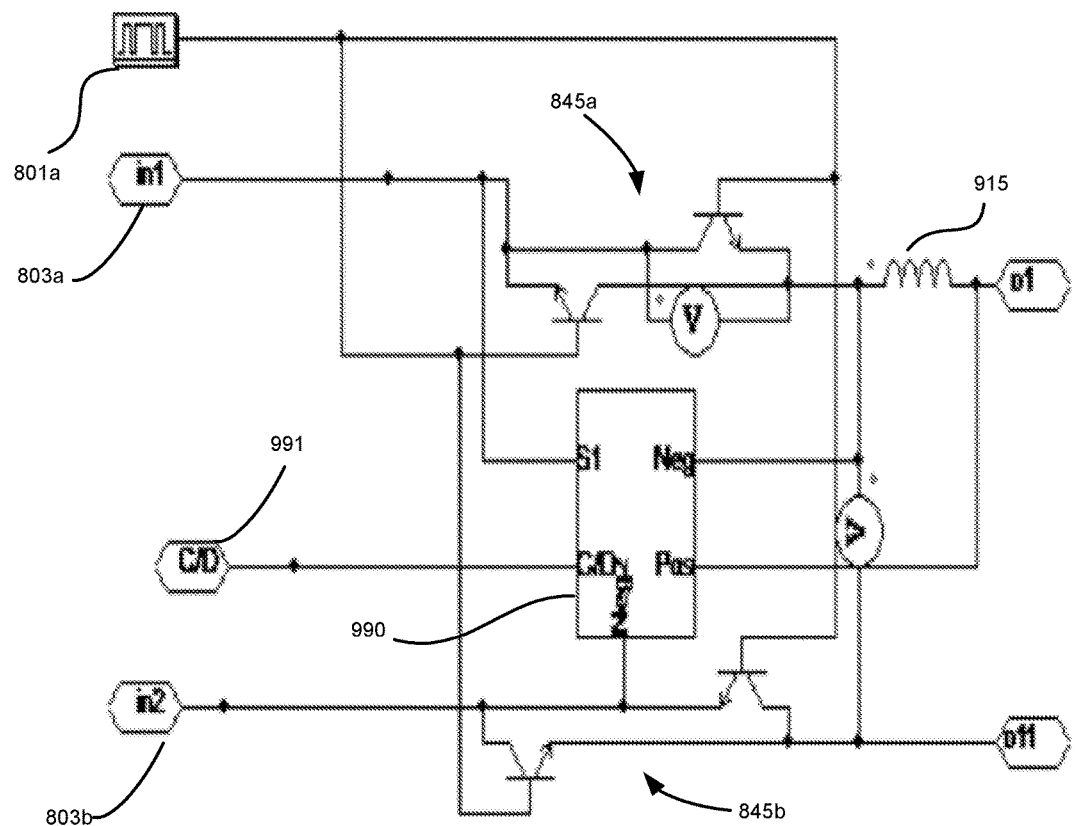
FIG. 9 is a circuit block diagram showing another variation of the circuit of FIG. 8, using a snubber.

FIG. 9 is a circuit block diagram 900 showing another variation of the circuit of FIG. 8, wherein recovery of the power stored in the inductor 915 is accomplished using a lossless snubber 990 concept, returning power back to the source. This diagram 900 is only shown for a single phase, wherein replication can be made for additional phases. Snubber control signal 991 controls snubber 990 to recover inductor power through a transformer and steering diode circuit to realize bi-directional power recovery.

Figure 10:
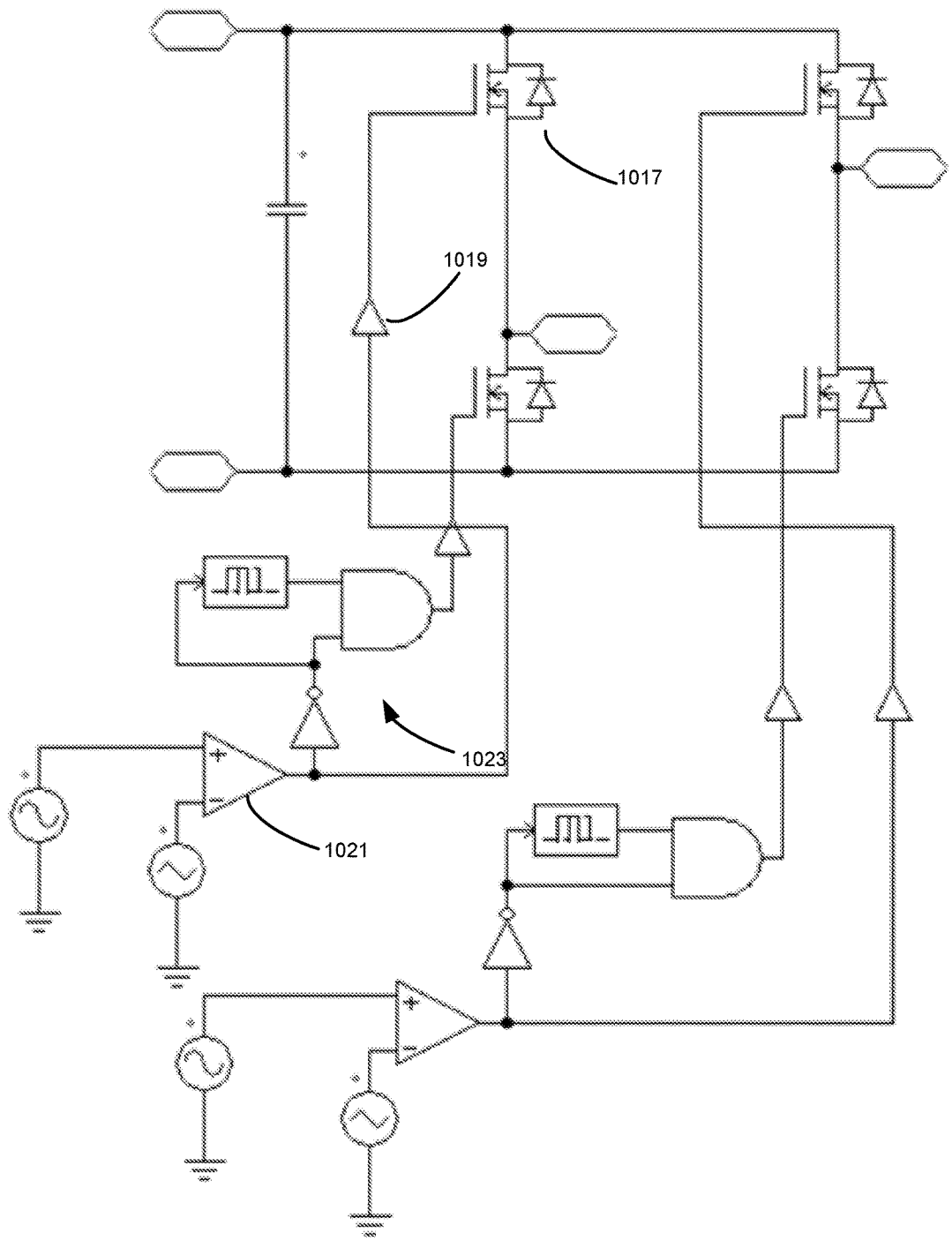
FIG. 10 shows a schematic of a two level single phase H bridge suitable for use in the above embodiments, with unipolar switching.

FIG. 10 shows a schematic 1000 of a two level single phase H bridge suitable for use in the above embodiments. While this bridge is shown composed of sets of transistor/diode switches 1017 with amplifiers 1019, op-amps 1021, and logic gates (inverters, nots, ands, etc.) 1025, other configurations well known or providing the same or equivalent functionality may be used. It is understood that the H bridge shown is capable of being switched into uni-polar mode to reduce the filter needs. Or, the H bridge can be switched to the mode of a full wave active rectifier to transport regenerative power from suitable loads and apply a controlled power range to the D.C. source. If this latter approach is utilized, then an overall efficiency is gained in the topology. The functionality of H bridges is well understood, therefore it is not further elaborated herein.

Figure 11:
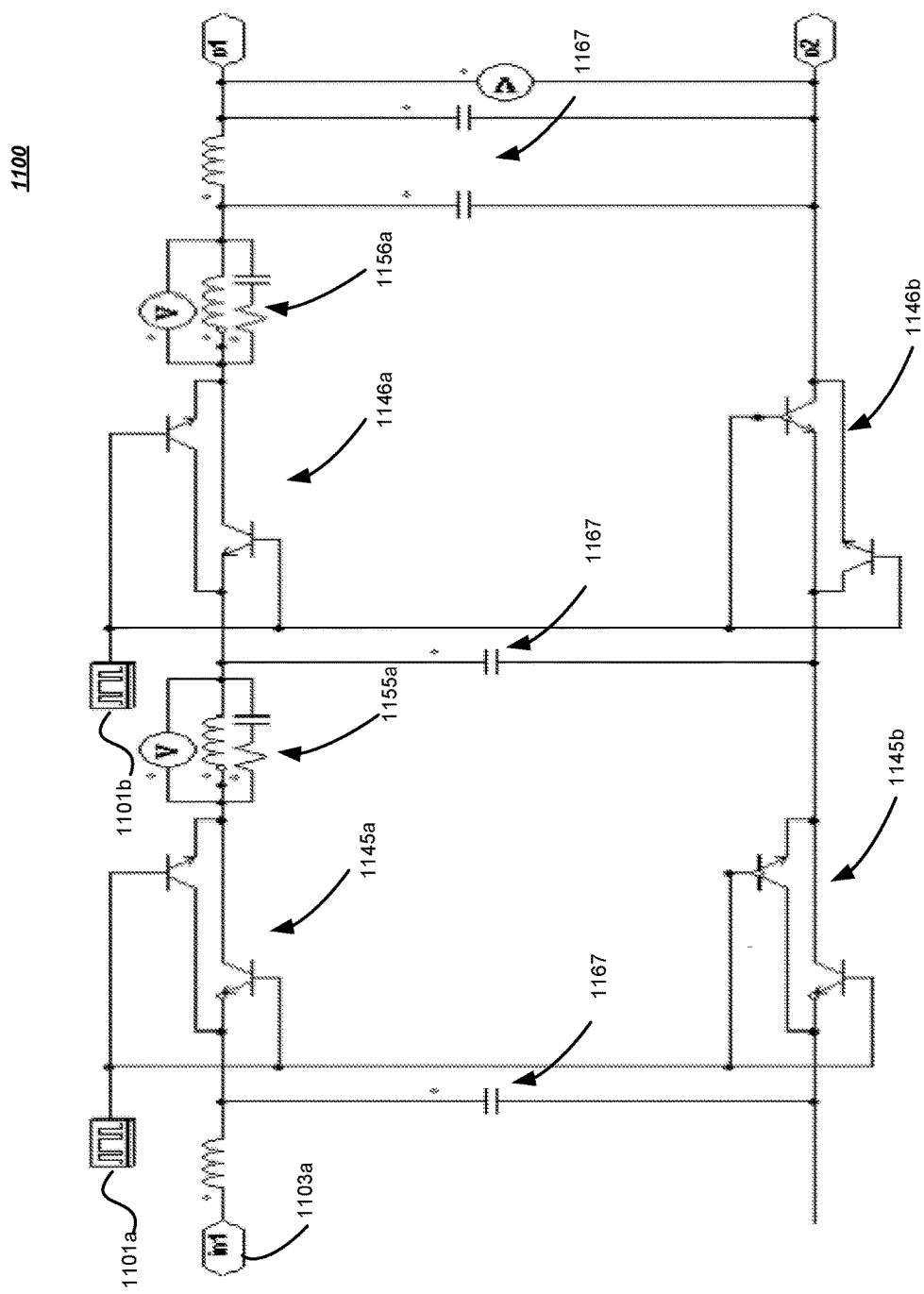
FIG. 11 is a schematic of another variation of a low loss isolation circuit, showing the initial legs only.

FIG. 11 is a schematic 1100 of another variation of a low loss isolation circuit, showing the initial legs only. Switching signals 1101*a,b* provides on/off switching of the downstream transistors (of switch pairs 1145*a,b* and 1146*a,b*, respectively). While input voltage(s) 1103*a* is routed through the switches and output into the inductor/capacitor/resistor equivalences 1155*a,b*. The capacitors 1167 operate as a buffer, that is, as an energy storage component between the source and the multiplexer. The various inductors and capacitors shown, may or may not be necessary for the circuit.

Figure 12:
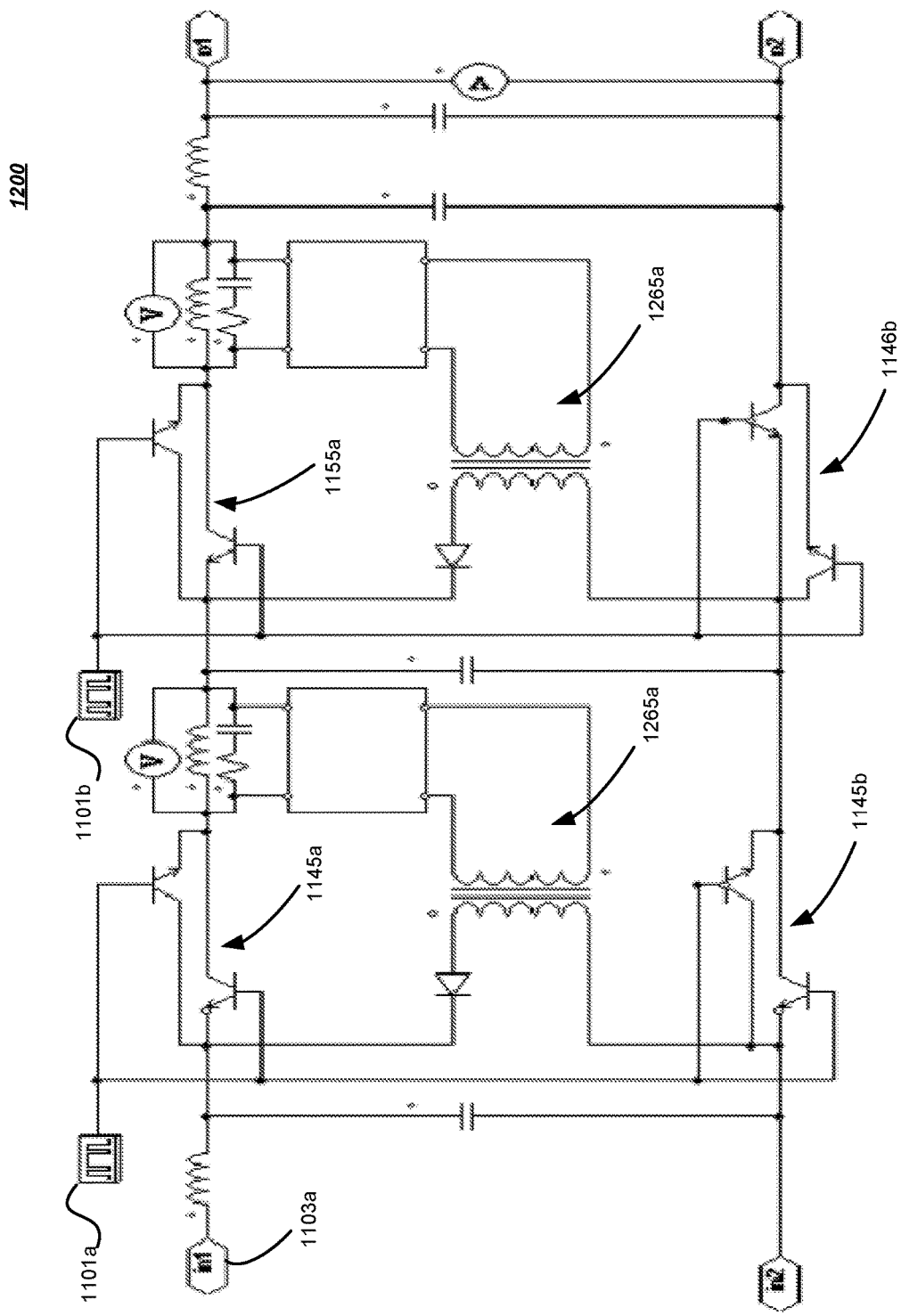
FIG. 12 is an illustration showing another configuration for the isolator(s) described above, with an energy recovery circuit

FIG. 12 is an illustration 1200 showing another configuration for the isolator(s) described above, with an energy recovery circuit 1266*a,b*. The energy recovery circuit 1266*a,b* can be a transformer/diode/switch, as shown or a resonant (series or parallel) circuit or other combinations thereof. Element 1277 is a reversing switch or steering diode circuit, etc. Energy from the recovery circuit 1266*a,b* is DC fed back into the isolator's input which can be channeled to the DC or Grid source or to a storage system (for example, a battery). The various inductors and capacitors shown may or may not be necessary for the circuit.

It should be appreciated that the above embodiments enable a device and method to generate single/split or three phase AC voltages from a DC source with 1 to 2 times gain in output voltage without using any DC/DC boost or an output transformer. The isolation/multiplexer/mixer circuits shown are capable of successively charging multiple power modules, allowing each power module to generate a desired output voltage with a desired magnitude(s), and phase(s) and allow these independent outputs of each power converter modules to be reconnected to obtain up to two times the conventional possible output voltage. With isolation of the source from the load, the common mode noise path is eliminated, removing the need for galvanic isolation within the dielectric capability of switching devices. A gain in output voltage and isolation between the output converters eliminates the need of the front end DC/DC converter or an output transformer for most of the DC voltage sources. This improves cost, power density, efficiency and reliability of the inverter. It should also be apparent than bi-directional power flow can be achieved, to charge the source or other energy storage devices.

Control of the switches and frequencies (carrier or otherwise) can be accomplished via software running on a computer or processor. Accordingly, some embodiments of the present disclosure, or portions thereof, may combine one or more hardware components such as microprocessors, microcontrollers, or digital sequential logic, etc., such as processor with one or more software components (e.g., program code, firmware, resident software, micro-code, etc.) stored in a tangible computer-readable memory device such as a tangible computer memory device, that in combination form a specifically configured apparatus that performs the functions as described herein. These combinations that form specially-programmed devices may be generally referred to herein "modules". The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, and the like. A given module may even be implemented such that the described functions are performed by separate processors and/or computing hardware platforms.

Note that the functional blocks, methods, devices and systems described in the present disclosure may be integrated or divided into different combinations of systems, devices, and functional blocks, as would be known to those skilled in the art. Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A transformer-less method of generating a multi-phase AC output voltages, comprising:
   coupling an input of a source switching multiplexer to an output of at least one of a grid source and DC source, and selectively transferring multiplexed power to an input of a plurality of power converters;
   successively power converting the multiplexed power to generate a predetermined AC energy level, wherein a first power converter of the plurality of power converters generates a predetermined voltage and phase angle that is independent of and isolated from a non-first power converter of the plurality of power converters; and
   adding outputs from the plurality of power converters to generate a peak output AC voltages or AC currents that are capable of being higher than the input source, without switching to higher input voltages or using a transformer.

2. The method of claim 1, wherein the plurality of power converters are combinable via software controllable switches, having independent voltage outputs to enable them to be independently combined.

3. The method of claim 2, wherein the software controllable switches are controlled to produce an output voltage that is at least one of a single phase, split phase and three phase.

4. The method of claim 2, wherein the generated output AC voltage or AC current is twice the source voltage or current.

5. The method of claim 3, wherein a switchable full bridge is employed that can be switched to a unipolar switching pattern to reduce a filter size.

6. The method of claim 5, wherein a power converter switching frequency carrier wave is phase shifted, to obtain additional reduction in the filter size.

7. The method of claim 3, wherein each power converter is independently controlled to obtain variable output phases and magnitudes, to provide controllable regenerative energy.

8. The method of claim 3, further comprising, isolating the source from a load using a front end isolator circuit.

9. The method of claim 8, further comprising, feeding power back into the source via a bi-directional isolator circuit.

10. The method of claim 8, further comprising, recovering power using a snubber circuit.

11. A transformer-less, switched source, multi-phase universal power inverter, comprising:
    a source switching multiplexer coupled to an output of at least one of a grid source and DC source, configured to output selectively multiplexed power;
    a plurality of switchable power converters, coupled to an output of the multiplexer, configured to successively power convert the multiplexed power to generate a predetermined isolated and bi-directional AC energy level, wherein a first power converter is configured to generate a predetermined voltage and phase angle that is independent of and isolated to a second power converter; and
    a computer or processor coupled to controllable switches of the power converters, configured to combine outputs from the power converters to generate a peak output AC voltage or AC current that is capable of being higher than the input source, without switching to higher input voltages or using a transformer.

12. The universal power inverter of claim 11, further comprising a plurality of power converters, which are independently combinable via software controllable switches, the power converters having independent voltage outputs for regenerative operation.

13. The universal power inverter of claim 12, wherein the output of inverter produces at least one of a single phase, split phase and three phase power.

14. The universal power inverter of claim 12, wherein the output is twice the source voltage or current magnitude.

15. The universal power inverter of claim 13, further comprising a switchable full bridge in the power converter(s), adapted to be switched to a unipolar switching pattern to reduce a filter size.

16. The universal power inverter of claim 13, further comprising a processor with software controlling switching of each power converter in an independent manner, to obtain variable output phases and magnitudes.

17. The universal power inverter of claim 13, further comprising, a front end isolator circuit.

18. The universal power inverter of claim 17, wherein at least one of the isolator and full bridge is bi-directional, permitting power to be fed back to the source.

19. The universal power inverter of claim 18, further comprising, a snubber circuit in the isolater, permitting recovery of power.

20. The universal power inverter of claim 15, wherein the full bridge is adapted to be switched into a full wave active rectifier, allowing transport of regenerative power from suitable loads to be applied with a controlled power range to the source.

* * * * *